Patented Mar. 6, 1923.

1,447,546

UNITED STATES PATENT OFFICE.

LOUIS W. GREVE, OF CLEVELAND, OHIO, ASSIGNOR TO THE CLEVELAND PNEUMATIC TOOL COMPANY, OF CLEVELAND, OHIO, A CORPORATION OF OHIO.

BLOWGUN.

Application filed January 7, 1920. Serial No. 349,944.

*To all whom it may concern:*

Be it known that I, LOUIS W. GREVE, a citizen of the United States, residing at Cleveland, in the county of Cuyahoga and State of Ohio, have invented a certain new and useful Improvement in Blowguns, of which the following is a full, clear, and exact description.

This invention relates to what is known in the trade as blow-guns, consisting essentially of a nozzle-like member to which an air hose may be attached and containing a valve by which air can be discharged from the outlet end in a strong stream for cleaning purposes, generally for the purpose of blowing chips and the like from machine tools.

The principal object of the invention is to provide an improved blow-gun with a valve which not only can be opened and closed to permit the flow, or stop the flow of air, but is constructed to allow a graduated flow so that the operator can with a simple form of valve, preferably of the plunger type, control the volume and pressure of air directed through the nozzle.

The invention may be briefly summarized as consisting in certain novel details of construction, and combinations and arrangements of parts which will be described in the specification and pointed out in the appended claims.

In the accompanying sheet of drawings wherein I have shown the preferred form of my invention, Fig. 1 is a longitudinal sectional view through a blow-gun constructed in accordance with my invention; and Fig. 2 is a top plan view.

The blow-gun consists of a body, preferably in the form of a casting 10 which may be of any suitable configuration or shape, but preferably is elongated and is both tapered and somewhat curved from the inlet end to the discharge end. At the relatively large or inlet end there is a threaded opening 11 for a hose or pipe connection by which air under pressure is supplied to the device. At the opposite or reduced end is a tip or nozzle 13 which is preferably made removable and is generally in the form of a separate device screwed into the end of the blow-gun body 10.

Between the inlet and outlet ends is a valve and a valve seat. The valve seat is formed in the dividing partition or seat member 14, and the valve is preferably in the form of a cylindrical plunger 15 provided at its upper or outer end with a cap or head 16, and at its lower end with a slightly enlarged tapered portion 17 which engages a tapered part of the valve seat. The plunger has bearings in aligned openings in the top of the body 10, and in the seat member 14, the bearing in the latter being rather extended and constituting a part of the valve seat, for as will subsequently appear, the air is not only controlled through the engagement and disengagement of the tapered parts of the valve and seat, but by the closure and opening of ports above the tapered part of the valve by the movement of the valve through the cylindrical opening of the valve seat member.

Below, and in line with the plunger 15 is a removable screw plug 18, forming a seat for a spring 19 which engages the lower end of the valve plunger 15 and normally holds the valve tightly closed so as to prevent the escape of air through the blow-gun.

Extending lengthwise through a portion of the valve plunger there is an inner passageway 20 with outlet openings 21, which are above the seat member 14, or on the outlet side of the valve regardless of the extent to which the plunger is depressed. At and adjacent these outlet ports 21 the plunger is preferably somewhat reduced as shown. At the lower end of the valve plunger, just above the tapered part 17 there are two axially offset series of intake ports 22, one series being located above the other, and both series being closed by the seat member 14 when the valve is closed.

When the tapered part of the valve engages the tapered part of the seat no flow of air through the blow-gun can take place since the intake ports 22 are all closed; but if the operator depresses the plunger so that the lower ports only are opened to the intake side of the valve, a certain volume of air less than the maximum can pass through the blow-gun, and the amount of air passing through can be varied by partially opening or closing the lower series of ports. However, should he depress the valve until both series of ports 22 are exposed, then the maximum volume of air at maximum pressure passes through the blow-gun. Thus the operator is able to control the volume and pressure of the air passing through the out- Mar. 6, 1923.
T. A. HACKLEY
TIRE TREAD
Filed Oct. 1, 1921
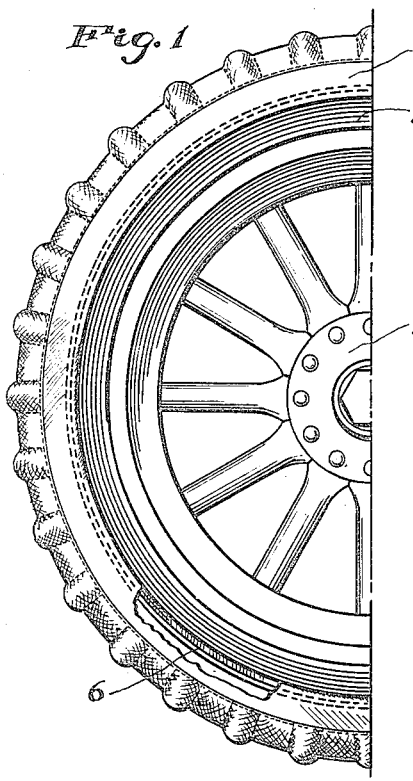
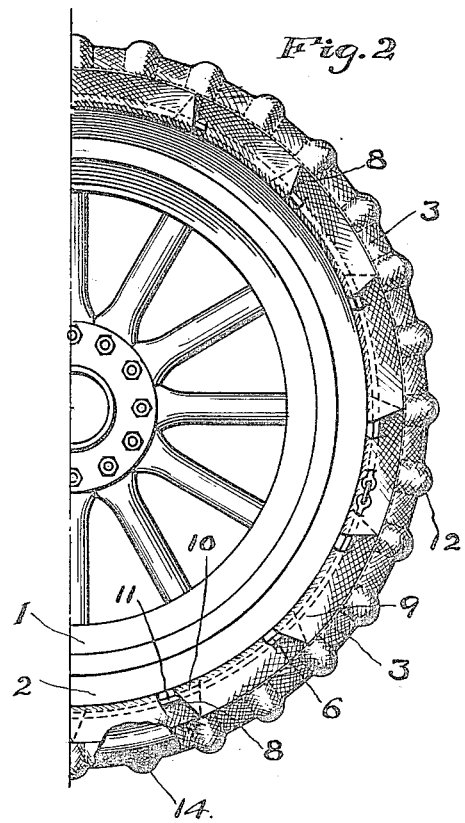
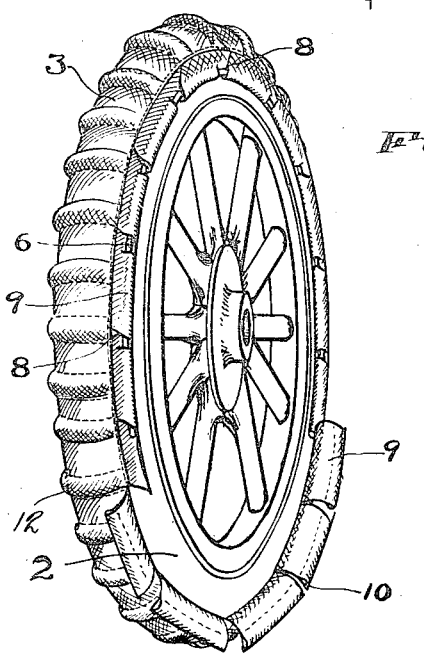
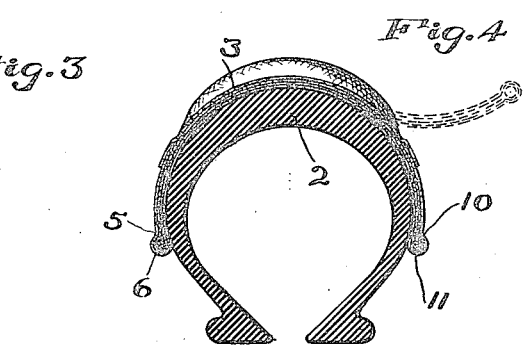
Inventor
THADDEUS A. HACKLEY
By Attorney
Richard J. Cook